(Model.)
B. S. ATWOOD.
HINGE.
No. 378,861. Patented Mar. 6, 1888.
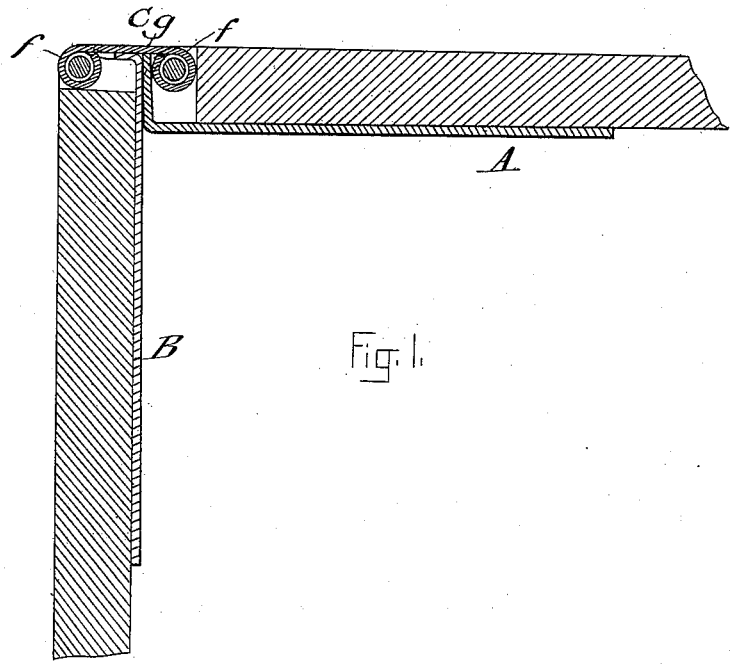
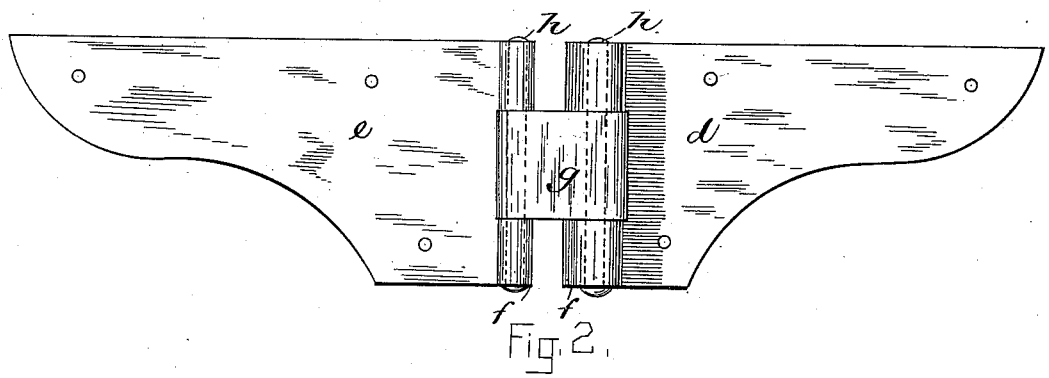
WITNESSES:
C. S. Gooding.
Anson M. Lyman.
INVENTOR:
Benjamin S. Atwood.
By Chas. R. Drew
Atty.

UNITED STATES PATENT OFFICE.

BENJAMIN S. ATWOOD, OF SOUTH ABINGTON, MASSACHUSETTS.

HINGE.

SPECIFICATION forming part of Letters Patent No. 378,861, dated March 6, 1888.

Application filed April 4, 1884. Serial No. 126,629. (Model.)

*To all whom it may concern:*

Be it known that I, BENJAMIN S. ATWOOD, a citizen of the United States, residing at South Abington, in the county of Plymouth and State of Massachusetts, have invented certain new and useful Improvements in Hinges for Boxes or Chests; and I do hereby declare that the following is a full, clear, and exact description of the invention, which will enable others skilled in the art to which it appertains to make use the same.

The object of my invention is a hinge which when applied to a box or chest will present a smooth face flush with the surface of the box or chest, with no part of it projecting beyond the surface.

In the drawings I have shown in Figure 1 a section of the side of the box with the cover attached thereto by means of my hinge, and in Fig. 2 a plan view of my hinge opened.

A is the side of the box.

B is the cover.

C is the hinge composed of the parts $d$ and $e$, placed on the inside, respectively, of the side of the box and of the cover, and bent in the form shown in the drawings in Fig. 1, so that the knuckles $ff$ are turned over and lie in places in the side of the box and in the cover cut for their reception. A certain portion of these parts $d$ and $e$ is turned at a right angle to the main portion, as shown in Fig. 1, the length of the part thus turned up and of the knuckle being equal to the thickness of the cover or of the side of the box to which it is to be applied. The two parts of the hinge are united by the plate $g$, having a knuckle at each end, and by the pins $h\,h$, passing through the knuckles on the two parts of the hinge, $d$ and $e$, and through the knuckles on the plate $g$, so as to form a double hinge. The plate $g$ is so constructed as to permit the part $e$ on the cover of the box, when it is closed, to bear against the inner side of the plate $g$. When the box is open, the plate will turn completely over and lie flat against the side of the box, so as to entirely remove the cover, thus opening the box to its fullest extent. It will be seen that the plate $g$ not only serves to connect the two parts of the hinge, but also furnishes a bearing for the cover when the box is closed, and permits it to be opened, as above explained. By the use of this plate $g$ and the double hinge sufficient space is obtained to enable the cover to be turned completely over.

What I claim, and desire to secure by Letters Patent, is—

A box-hinge composed of the parts $d$ and $e$, to be placed, respectively, on the inside of the box and of the cover, provided with end pieces turned at a right angle to their main portions, having the knuckles $ff$, fitting, respectively, into places in the side of the box and of the cover, and united by the plate $g$ and pins $h\,h$, said plate $g$ being placed on the outside of the box, and so arranged as to furnish a bearing to the cover when it is closed, and to permit the cover to be removed entirely from the top of the box when it is open, substantially as above described.

BENJAMIN S. ATWOOD.

Witnesses:
ROLAND C. LINCOLN,
CHAS. H. DREW.